(12) United States Patent
Cubillo (10) Patent No.: US 8,744,758 B2
(45) Date of Patent: Jun. 3, 2014

(54) DRIVING DIRECTIONS PRINTED TEXT SCALING

(75) Inventor: Pedro Antonio Cubillo, Medford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1999 days.

(21) Appl. No.: 11/612,687

(22) Filed: Dec. 19, 2006

(65) Prior Publication Data

US 2008/0147314 A1 Jun. 19, 2008

(51) Int. Cl.
*G01C 21/34* (2006.01)

(52) U.S. Cl.
USPC ............ 701/440; 701/431; 345/472; 358/1.2; 358/1.15

(58) Field of Classification Search
USPC ............... 455/456.1; 701/200, 201, 207, 208, 701/209, 400, 431, 440; 340/995.1, 995.11, 340/995.14, 995.15, 995.19; 345/418, 467, 345/468, 469.1, 471, 472; 358/1.1, 1.2, 358/1.15
See application file for complete search history.

(56) References Cited

U.S. PATENT DOCUMENTS

| | | | |
|---|---|---|---|
| 4,881,179 A | | 11/1989 | Vincent |
| 5,212,477 A | * | 5/1993 | Indekeu et al. ............. 340/7.55 |
| 5,559,707 A | * | 9/1996 | DeLorme et al. ............ 701/200 |
| 5,563,996 A | | 10/1996 | Tchao |
| 5,878,368 A | | 3/1999 | DeGraaf |
| 5,911,773 A | | 6/1999 | Mutsuga et al. |
| 5,944,769 A | | 8/1999 | Musk et al. |
| 5,948,040 A | * | 9/1999 | DeLorme et al. ............ 701/426 |
| 6,040,824 A | | 3/2000 | Maekawa et al. |
| 6,064,941 A | | 5/2000 | Nimura et al. |
| 6,076,041 A | | 6/2000 | Watanabe |
| 6,078,865 A | | 6/2000 | Koyanagi |
| 6,144,318 A | | 11/2000 | Hayashi et al. |
| 6,144,389 A | * | 11/2000 | Toshimoto et al. ........... 345/472 |
| 6,169,552 B1 | | 1/2001 | Endo et al. |
| 6,256,581 B1 | | 7/2001 | Fujii et al. |
| 6,282,493 B1 | | 8/2001 | Kitagawa et al. |
| 6,321,158 B1 | | 11/2001 | DeLorme et al. |

(Continued)

FOREIGN PATENT DOCUMENTS

| | | |
|---|---|---|
| JP | 2000-298026 | 10/2000 |
| JP | 2003-269987 | 9/2003 |

OTHER PUBLICATIONS

American Map Road Atlas 2005 United States: Large Scale Large Type (Spiral-Bound); Publisher: American Map (Aug. 2004); Language: English; ISBN-10: 0841625174; ISBN-13: 978-0841625174.*

(Continued)

*Primary Examiner* — Stephen Holwerda (57) ABSTRACT

An exemplary system includes a driving directions subsystem configured to provide data representative of driving directions to an access device communicatively coupled to the driving directions subsystem. The driving directions subsystem is further configured to provide at least one print tool including a plurality of selectable map views to the access device, the print tool enabling a user of the access device to select, from the selectable map views, at least one map view for inclusion in a printing of at least a subset of the driving directions. In certain embodiments, the driving directions include textual driving direction steps, and the driving direction subsystem is configured to scale a font size of at least a subset of the textual driving direction steps based on a number of the textual driving direction steps included in the driving directions.

23 Claims, 7 Drawing Sheets

(56) References Cited

U.S. PATENT DOCUMENTS

| | | |
|---|---|---|
| 6,339,746 B1 | 1/2002 | Sugiyama et al. |
| 6,405,123 B1 | 6/2002 | Rennard et al. |
| 6,427,118 B1 | 7/2002 | Suzuki |
| 6,442,478 B2 | 8/2002 | Hamada et al. |
| 6,452,597 B1 * | 9/2002 | Goldberg et al. ............ 345/472 |
| 6,477,460 B2 | 11/2002 | Kepler |
| 6,480,786 B2 | 11/2002 | Watanabe et al. |
| 6,509,974 B1 | 1/2003 | Hansen |
| 6,510,379 B1 | 1/2003 | Hasegawa et al. |
| 6,542,812 B1 | 4/2003 | Obradovich et al. |
| 6,671,619 B2 | 12/2003 | Kusano et al. |
| 6,694,252 B2 | 2/2004 | Ukita |
| 6,765,998 B2 | 7/2004 | Bruce et al. |
| 6,789,065 B2 | 9/2004 | Berner et al. |
| 6,836,728 B2 | 12/2004 | Shimabara et al. |
| 6,948,125 B2 | 9/2005 | Detweiler et al. |
| 6,950,744 B2 | 9/2005 | Daizen |
| 7,054,745 B1 | 5/2006 | Couckuyt et al. |
| 7,065,448 B1 * | 6/2006 | Gearhart ...................... 701/431 |
| 7,135,994 B2 | 11/2006 | Kamikawa et al. |
| 7,260,474 B1 * | 8/2007 | Thayathil et al. ............. 701/428 |
| 7,395,153 B1 * | 7/2008 | Nesbitt et al. ................ 701/533 |
| 7,437,238 B2 | 10/2008 | Monde et al. |
| 7,474,960 B1 * | 1/2009 | Nesbitt ........................ 701/533 |
| 7,584,412 B1 | 9/2009 | Raff |
| 7,599,795 B1 | 10/2009 | Blumberg et al. |
| 7,612,919 B2 | 11/2009 | Takahashi |
| 7,636,886 B2 | 12/2009 | Wyle |
| 7,706,973 B2 * | 4/2010 | McBride et al. ............. 701/423 |
| 7,913,179 B2 | 3/2011 | Sheha et al. |
| 2002/0049533 A1 | 4/2002 | Kusano et al. |
| 2002/0054123 A1 | 5/2002 | Walden et al. |
| 2002/0055952 A1 | 5/2002 | Clancey et al. |
| 2002/0073121 A1 | 6/2002 | Sano et al. |
| 2002/0099740 A1 | 7/2002 | Patrick |
| 2002/0120397 A1 | 8/2002 | Kepler |
| 2002/0154174 A1 | 10/2002 | Redlich et al. |
| 2003/0038835 A1 | 2/2003 | DeFelice |
| 2003/0107749 A1 * | 6/2003 | Aquilina ........................ 358/1.1 |
| 2003/0128139 A1 * | 7/2003 | Poltorak .................. 340/995.19 |
| 2003/0158651 A1 | 8/2003 | Matsuo et al. |
| 2003/0182052 A1 * | 9/2003 | DeLorme et al. ............. 701/201 |
| 2003/0191578 A1 | 10/2003 | Paulauskas et al. |
| 2004/0204840 A1 | 10/2004 | Hashima et al. |
| 2004/0243929 A1 | 12/2004 | Jones et al. |
| 2004/0254723 A1 | 12/2004 | Tu |
| 2005/0182564 A1 | 8/2005 | Kim |
| 2005/0195096 A1 | 9/2005 | Ward et al. |
| 2005/0197763 A1 | 9/2005 | Robbins et al. |
| 2005/0256844 A1 | 11/2005 | Cristol |
| 2005/0270311 A1 * | 12/2005 | Rasmussen et al. .......... 345/677 |
| 2005/0288859 A1 | 12/2005 | Golding et al. |
| 2006/0064241 A1 * | 3/2006 | Rasmussen et al. .......... 701/201 |
| 2006/0066608 A1 | 3/2006 | Appolloni |
| 2006/0069503 A1 | 3/2006 | Suomela et al. |
| 2006/0089792 A1 | 4/2006 | Manber et al. |
| 2006/0178826 A1 | 8/2006 | Gomi |
| 2007/0032947 A1 | 2/2007 | Yamada et al. |
| 2007/0050340 A1 | 3/2007 | von Kaenel et al. |
| 2007/0078596 A1 | 4/2007 | Grace |
| 2007/0083428 A1 | 4/2007 | Goldstein |
| 2007/0162474 A1 | 7/2007 | Parupudi et al. |
| 2008/0147314 A1 | 6/2008 | Cubillo |
| 2008/0255849 A9 | 10/2008 | Gustafson |
| 2009/0118995 A1 | 5/2009 | Zhao et al. |
| 2010/0057347 A1 | 3/2010 | Sugiyama et al. |
| 2010/0217514 A1 | 8/2010 | Nesbitt |

OTHER PUBLICATIONS

"Take the Power of the Google Maps With You On Your Mobile Phone", Google Maps Beta, downloaded Sep. 7, 2006, http://www.google.com/gmm/index.html?utm_source=us-ha-aws&utm_campaign=utm_medium=cpc&utm_term=google.

* cited by examiner

DRIVING DIRECTIONS PRINTED TEXT SCALING

BACKGROUND INFORMATION

Computerized applications have been developed for generating and providing driving directions in response to user requests. For example, a user may access a conventional driving direction application, identify a starting location and a destination location, and receive in return driving directions descriptive of a driving route between the locations. The driving directions may include an electronic map of a geographic area and/or a number of textual steps descriptive of the driving route.

Many traditional driving direction applications allow a user to print a set of generated driving directions for future reference. However, these applications provide the user with only limited control over the information to be printed and the format in which it can be printed. For example, certain conventional driving direction applications can include only a single map image in a printout, and other conventional driving direction applications do not provide a user with sufficient control over the selection of driving direction information to be included in the printout. Printouts of driving direction information may in some cases be limited to a preformatted layout that may not be conducive to the needs of all users.

These and other shortcomings of conventional driving direction applications tend to frustrate users who desire a greater level of control for printing driving directions. For at least these reasons, there is a need for systems and methods that provide users with additional control over the printing of driving directions.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF EXEMPLARY EMBODIMENTS

I. Introduction

Exemplary embodiments may be implemented as systems and methods for printing driving directions. As used herein, the term "driving directions" refers broadly to any computer-generated information descriptive of a geographic area, route, and/or directions for traveling from one geographic location to another. Driving directions may include, but are not limited to, one or more textual steps descriptive of a travel route and/or one or more electronic maps illustrative of a geographic area. The maps may correspond to the textual driving directions steps and may illustrate at least a subset and/or segment of the travel routes described by the textual steps.

The exemplary systems and methods described herein provide driving directions and at least one print tool enabling a user to control the printing of at least a subset of the driving directions. The driving directions and print tools may be displayed in one or more graphical user interfaces such that users can utilize the print tools to select from a plurality of print options for printing the driving directions.

In certain embodiments, an exemplary print tool includes a plurality of selectable map views from which a user is able to select at least one of the map views for inclusion in a printing of at least a subset of the driving directions. The selectable map views, which may be concurrently displayed in a graphical user interface, can illustrate different zoom level views of a geographic area. The user may select multiple map views to be included in a printing, and selections of map views may be visually indicated in the graphical user interface. The user may initiate a printing of the selected map view(s) in any suitable manner.

The selectable map views enable the user to conveniently select map views to be included in a printing. Significantly, multiple map views may be included in a printout, which may be on a single page (e.g., a sheet of paper or a display screen) in some examples. Accordingly, the user can create a custom map printout, which may include different zoom level map views organized in a manner that is convenient and helpful to the user. The capability of customizing map printouts enables the user to organize and print driving directions as may best suit a particular purpose, preference, or application.

In certain embodiments, at least a subset of driving directions may be scaled in size based on the number of steps included in the driving directions. For example, a font size of at least a subset of textual driving direction steps may be set based on the number of driving direction steps included in the driving directions. In some examples, a first font size is applied when the number of steps is less than or equal to a predefined threshold, and a second font size is applied when the number of steps is more than the predefined threshold. Alternatively or additionally, the size of spaces between textual driving direction steps may be similarly scaled based on the number of steps in the driving directions.

The scaling of the size of driving directions based on the number of steps included in the driving directions enables the exemplary systems and methods to efficiently utilize print areas of different sizes. The font sizes and predefined thresholds may be adjusted to accommodate print areas of different sizes, including single page print areas. The scaling of driving directions may be used in conjunction with any of the print options described herein. For example, driving directions may be scaled in size to fit within a print area (e.g., a half or full print page) associated with a particular print option.

The print tools described herein provide users with significant and user-friendly control over the printing of driving direction information. The user-friendly control provides users with an attractive feature that can help differentiate one driving direction application from another. This differentiation may help increase revenues associated with a driving direction application employing the features described herein.

Unless stated otherwise, the terms "print," "printing," and "printout" as used herein refer broadly to any presentation of driving direction information, including, but not limited to, printing of driving directions in hardcopy form such as on paper or another print medium and printing of driving directions in electronic form such as displaying the driving directions on an electronic display screen.

Components and functions of exemplary embodiments of systems and methods for printing driving directions will now be described in detail.

II. Exemplary System View

Figure 1:
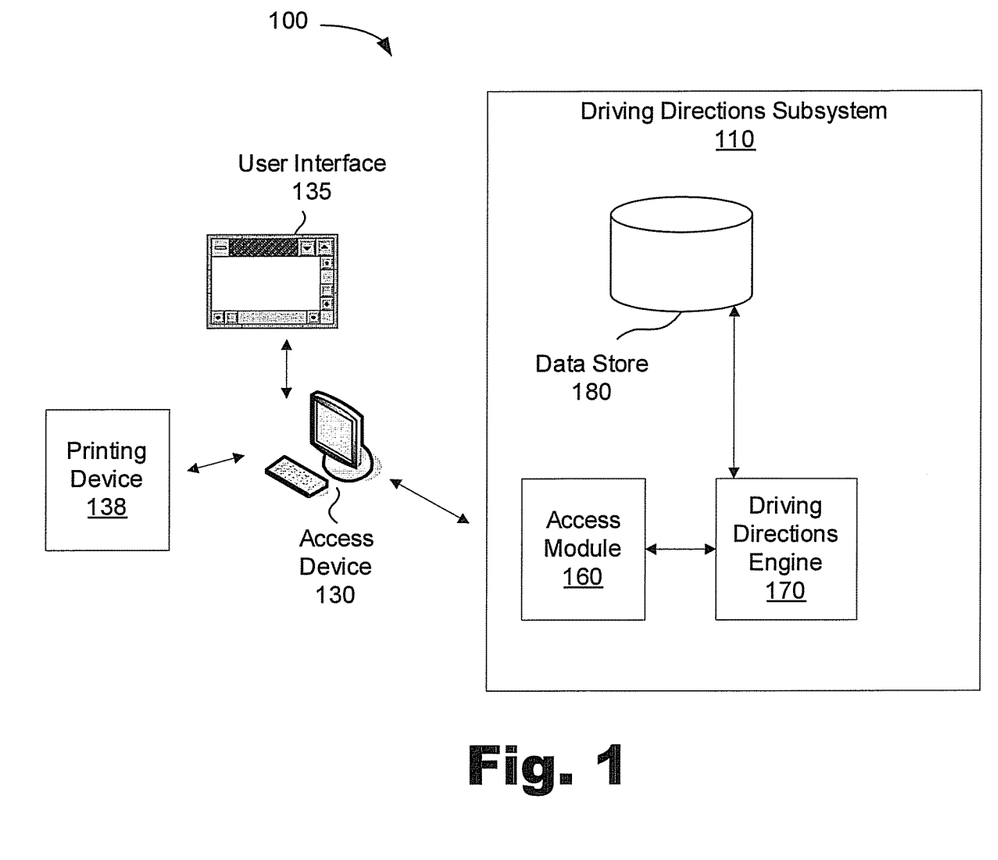
FIG. 1 is a block diagram illustrating an exemplary driving direction system.

FIG. 1 illustrates an example of an exemplary driving direction system 100 (or simply "system 100"). As shown in FIG. 1, system 100 may include a driving directions subsystem 110 configured to communicate with an access device 130 that is configured to present a user interface 135 for consideration by a user of the access device 130. The access device 130 is communicatively coupled to and configured to provide printing instructions and data to a printing device 138. The driving directions subsystem 110 may include an access module 160, driving directions engine 170, and data store 180.

The elements of the system 100 may communicate using any known communication technologies, devices, media, and protocols supportive of data communications, including, but not limited to, the Internet, the World Wide Web, intranets, local area networks, wide area networks, mobile (e.g., cellular) telephone networks, wireless networks, optical fiber networks, satellite networks, telephone networks, packet-switched networks, other communications networks, data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, data bus technologies, wireless communication technologies (e.g., WiFi), and other suitable communications technologies. In certain embodiments, the access device 130 and the driving directions subsystem 110 communicate with one another via a communication network, which may include, but is not limited to, any of the networks listed above (e.g., the Internet).

In certain embodiments, the elements of the system 100 are implemented in one or more computers. The system 100 may include any computer hardware and/or instructions (e.g., software and firmware programs), or combinations of software, firmware, and hardware, configured to perform the processes described herein. In particular, it should be understood that the driving directions subsystem 110 may be implemented on one or more than one physical computing device. Accordingly, the system 100 may include any one of a number of well-known computing devices (e.g., one or more servers), and may employ any of a number of well-known computer operating systems, including, but by no means limited to, known versions and/or varieties of the Microsoft Windows® operating system, the Unix operating system, and the Linux operating system.

Accordingly, the processes described herein may be implemented at least in part as instructions executable by one or more computing devices, as is well known. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary system 100 is shown in FIG. 1, the exemplary components illustrated in the Figure are not intended to be limiting. Indeed, other alternative hardware environments and implementations may be used. Each of the components of the system 100 will now be described in additional detail.

A. Access Device

The access device 130 may include any device physically or remotely accessible to one or more users (e.g., users requesting driving directions from the driving directions subsystem 110) and that allows a user to provide input to and receive output from the driving directions subsystem 110. For example, the access device 130 can include, but is not limited to, one or more desktop computers, laptop computers, tablet computers, personal computers, kiosks, personal data assistants, mobile (e.g., cellular) telephones, satellite pagers, wireless internet devices, embedded computers, video phones, network interface cards, mainframe computers, mini-computers, programmable logic devices, vehicles, personal communication devices, and any other devices capable of communicating with the driving directions subsystem 110. The access device 130 can also include various peripherals such as a terminal, keyboard, keypad, mouse, screen, printer, stylus, input device, output device, or any other apparatus that can help a user interact with the access device 130.

The access device 130 may be communicatively coupled to the driving directions subsystem 110 using any suitable communication technologies, including any of the communication technologies listed above. In certain embodiments, the access device 130 and the driving directions subsystem 110 are configured to communicate via the Internet or World Wide Web.

The access device 130 provides access to the driving directions subsystem 110. Accordingly, one or more users may utilize the access device 130 to provide requests to and receive output from the driving directions subsystem 110. In particular, users are able to use the access device 130 to provide requests for driving directions to the driving directions subsystem 110. The requests may include data representative of one or more geographic locations or areas, including a starting location and a destination location. The locations may be identified by street addresses, city identifiers, state identifiers, territory identifiers, zip codes, airport codes, Global Positioning System coordinates, other suitable location identifiers, or any combination thereof.

Output from the driving directions subsystem 110 may be provided to the access device 130 and may include data representative of driving directions and at least one print tool for controlling a printing of at least a subset of the driving directions. Examples of driving directions generated and provided by the driving directions subsystem 110 are described further below. The access device 130 can present the driving directions and related information and print tools in the user interface 135 for consideration and utilization by the user of the access device 130.

The access device 130 may include instructions for generating and operating the user interface 135. The instructions may be in any computer-readable format, including software, firmware, microcode, and the like. When executed by a processor (not shown) of the access device 130, the instructions may present the user interface 135 to a user of the access device 130, as is well known.

The access device 130 may include instructions for communicating with the printing device 138, including instructions for initiating printing driving directions and/or other data. The instructions may be in any computer-readable format, including software, firmware, microcode, and the like. When executed by a processor (not shown) of the access device 130, the instructions may generate and provide printing instructions to the printing device 138.

While FIG. 1 shows a single access device 130, this is only illustrative. One or more access devices 130 may communicate with and benefit from messages and/or data provided by the driving directions subsystem 110.

B. User Interface

The access device 130 may present the user interface 135 to a user as a way for the user to initiate communications with and/or consider output from the driving directions subsystem 110. The user interface 135 may be equipped to present information to and receive input from users. As described below, for example, the user interface may present driving directions and tools for controlling the printing of the driving directions to a user of the access device 130.

The user interface 135 may comprise one or more graphical user interfaces ("GUI") capable of displaying information and receiving input from users. In certain exemplary embodiments, the user interface 135 includes a web browser, such as Internet Explorer® offered by Microsoft Corporation of Redmond, Wash.

However, the user interface 135 is not limited to a web form embodiment and may include many different types of user interfaces that enable users to utilize the access device 130 to communicate with the driving directions subsystem 110. In some embodiments, for example, the user interface 135 may include a voice interface capable of receiving input from and providing output to a user. Merely by way of example, the user interface 135 may include voice recognition applications. Accordingly, users may be able to provide requests and receive corresponding driving directions in audio format. Driving directions in audio format can be especially beneficial to users who either cannot or do not want to read driving directions while driving.

C. Printing Device

The printing device 138 is communicatively coupled to the access device 130 and may include any device or combination of devices or communication technologies useful for communicating with the access device 130. Communications between the access device 130 and the printing device 138 may be supported by any suitable communications technologies, including, but not limited to, one or more wired and/or wireless connections, protocols and interfaces such as Universal Serial Bus ("USB"), IEEE 1394, IEEE 802.11, Bluetooth, serial interfaces, parallel interfaces, and Ethernet connections. The printing device 138 may be located proximate to the access device 130 or at a remote location. The printing device 138 may be separate from or integrated with the access device 130.

The printing device 138 may include any technologies helpful for recording electronic data in hardcopy form such as on paper or other suitable print medium. In particular, the printing device 138 can print data received from the access device 130, including data representative of driving directions. The printing device 138 may include an inkjet printer, laser printer, or other known device for printing electronic data.

The printing device 138 is not limited to printing electronic data in hardcopy form. In certain embodiments, for example, the printing device 138 may alternatively or additionally include a display screen or be configured to provide (i.e., print) data to a display screen, such as a navigation display in a vehicle or a display screen of a mobile phone.

D. Driving Directions Subsystem

The driving directions subsystem 110 may include any device or combination of devices and communication technologies useful for communicating with the access device 130. The driving directions subsystem 110 may also include any device or combination of devices and data storage and processing technologies useful for storing and processing data, including data useful for generating driving directions. The components of the driving directions subsystem 110 will now be described.

1. Data Store

The data store 180 may include one or more data storage mediums, devices, or configurations and may employ any type, form, and combination of well-known storage media, including hard disk drives, read-only memory, caches, databases, optical media, and random access memory. Data store 180 may include any known technologies useful for storing, updating, modifying, accessing, retrieving, deleting, and managing data.

The data store 180 may store any data useful for the generation of driving directions. For example, the data store 180 may include Geocode data, map data, addresses, listings, and other driving directions data useful for generating driving directions, as is well known. The data stored in the data store 180 may be provided and/or maintained manually, automatically, or with a combination of manual and automatic steps. Alternative or in addition to the data stored in the data store 180, the driving directions subsystem 110 may use data from external sources to generate driving directions.

2. Driving Directions Engine

The driving directions engine 170 may be configured to receive and fulfill requests for driving directions, as is well known. The driving directions engine 170 typically receives such requests from the access module 160, which has received the requests from the access device 130, as described below. When a request for driving directions is received, for example, the driving directions engine 170 may query the data store 180 and/or one or more external sources for data useful for generating driving directions to fulfill the request. The output from the driving directions engine 170 may be in any suitable data format(s) and may include any acceptable representation of driving directions. The generated driving directions may include, but are not limited to, textual, audible, visual (e.g., maps), and other suitable representations of driving routes, geographic areas, and/or related information.

The driving directions engine 170 may be configured to generate and provide different views of driving directions, including any of the print option views described below. Examples of driving directions and views of driving directions will be described below in relation to FIGS. 2-6.

3. Access Module

The access module 160 may include any suitable communication technologies for communicating with the driving directions engine 170 and the access device 130. In certain embodiments, the access module 160 includes or is implemented in one or more servers (e.g., web servers) configured to communicate with the access device 130. The communications between the access module 160 and the access device 130 may be transmitted over any suitable communication network, including the Internet or the World Wide Web.

The access module 160 may be configured to receive from the access device 130 data representative of requests for driving directions, as described above. The requests may be forwarded from the access module 160 to the driving directions engine 170, which generates responses to the requests, as described above. The responses generally include driving directions that have been generated based on information included in the requests.

The access module 160 may be configured to receive output (e.g., the responses to the requests) from the driving directions engine 170. The access module 160 processes the output, including ensuring that it is in suitable form for transmission to the access device 130. For example, the access module 160 may be configured to insert the output, including the driving directions, into Hypertext Markup Language ("HTML") messages for transmission to the access device 130 using Hypertext Transport Protocol ("HTTP"). Of course, other suitable data formats and protocols may be used.

In certain embodiments, the output generated by the driving directions engine 170 includes one or more print tools that, when provided to the access device 130, enable a user of the access device 130 to control print options for printing the driving directions. In certain other embodiments, the access module 160 is configured to associate the one or more print tools with the driving directions output by the driving directions engine 170. The access module 160 may insert the driving directions output and the associated at least one print tool into HTML messages that can be transmitted to the access device 130, which is able to present the content of the HTML messages in the user interface 135 for consideration by a user. Of course, other suitable types of data messages may be used. Accordingly, the access module 160 is able to provide data representative of driving directions and one or more associated print tools to the access device 130.

The access device 130 is configured to receive and present the data representative of the driving directions and print tools for consideration by a user. As described below, the print tools enable users to control print options for printing at least a subset of the driving directions. The driving directions and print tools may be presented in one or more graphical user interfaces for consideration and utilization by users.

Figure 2:
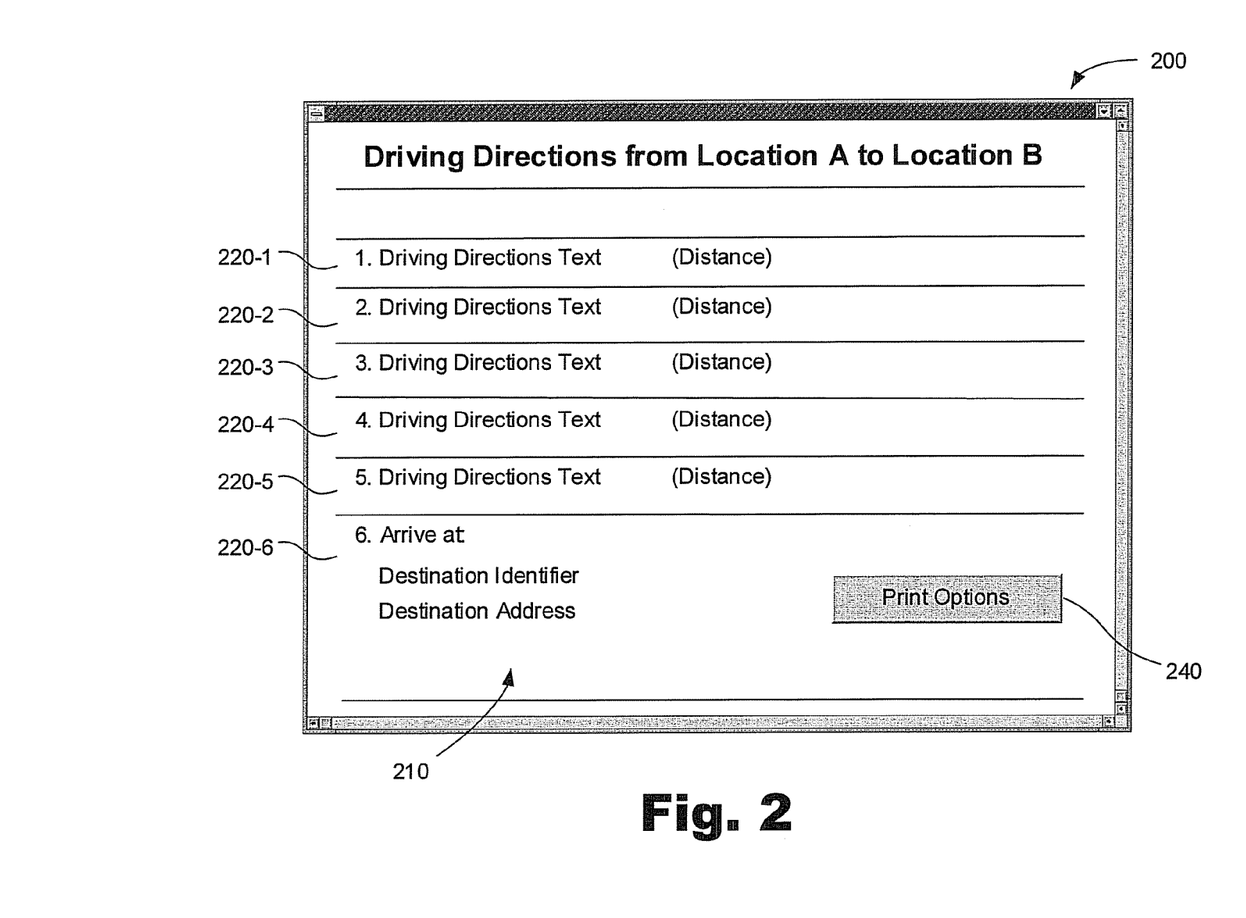
FIG. 2 illustrates an exemplary graphical user interface including textual driving directions and a print tool for accessing driving direction print options.

To facilitate and understanding of driving directions and print tools that may be provided by the driving directions subsystem 110, FIGS. 2-6 illustrate exemplary graphical user interfaces ("GUIs") including driving directions and/or exemplary tools for printing driving directions. FIG. 2 illustrates an exemplary graphical user interface ("GUI") 200 that may be presented in the user interface 135. As shown in FIG. 2, GUI 200 may include driving directions 210 having one or more driving direction steps 220-1 through 220-6 (referred to collectively as "the driving direction steps 220" or simply "the driving steps 220"), as well as a print options tool 240 (or simply "the print tool 240"). In the example shown in FIG. 2, each of the driving direction steps 220 includes a textual description of a driving instruction.

Figure 3:
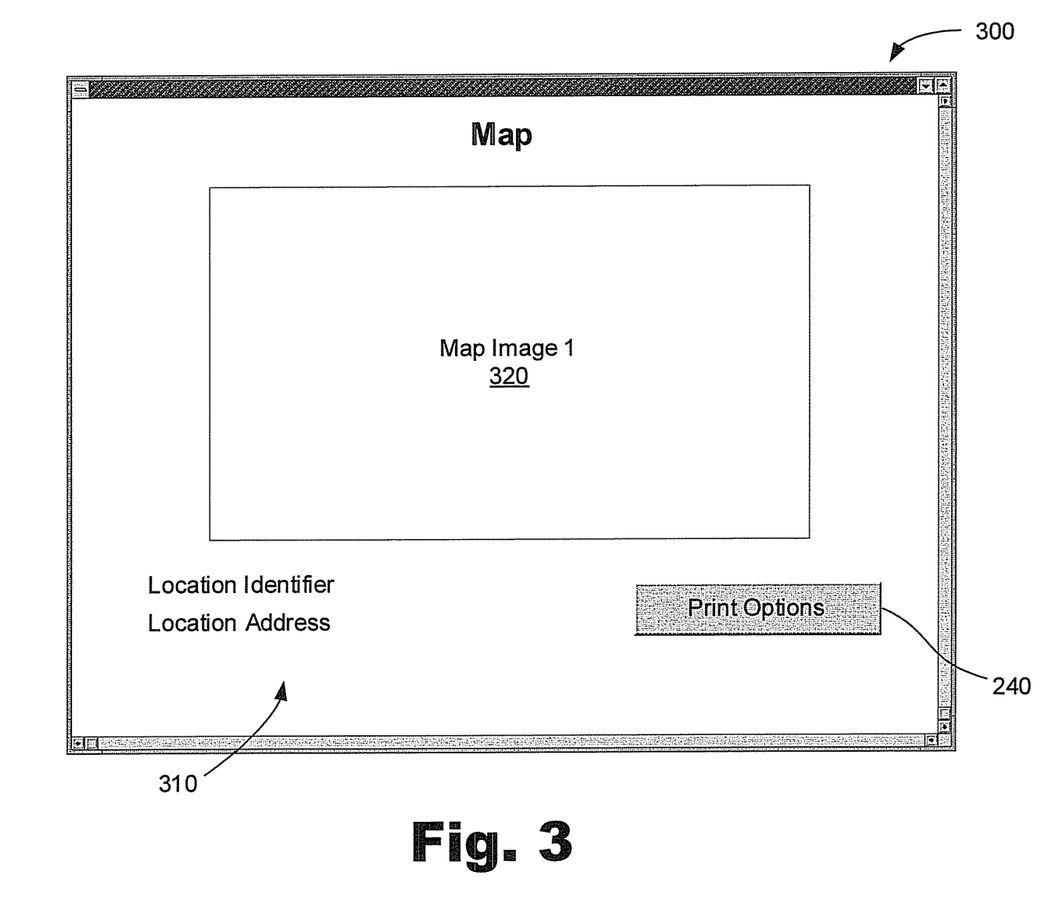
FIG. 3 illustrates another exemplary graphical user interface including a map and a print tool for accessing driving direction print options.

Alternative or in addition to textually represented driving direction steps, the driving directions subsystem 110 may provide a map depicting a geographic area. FIG. 3 illustrates another graphical user interface ("GUI") 300 that may be presented in the user interface 135. GUI 300 may be similar to GUI 200 except that the driving directions 310 included in the GUI 300 may include an electronic map image 320 instead of textually represented driving direction steps 210. In other examples, both textual driving direction steps 220 and map image 320 may be included together in a graphical user interface. Thus, the driving directions subsystem 110 may be configured to provide driving directions in different forms, including but not limited to electronic maps, textual driving direction steps, or combinations thereof.

GUI 200 or GUI 300 may be presented to a user in response to a request for driving directions from one geographic location to another (e.g., Location A to Location B) or in response to a request for an electronic map associated with a location (e.g., either Location A or Location B). Such requests are collectively referred to requests for driving directions.

Figure 4:
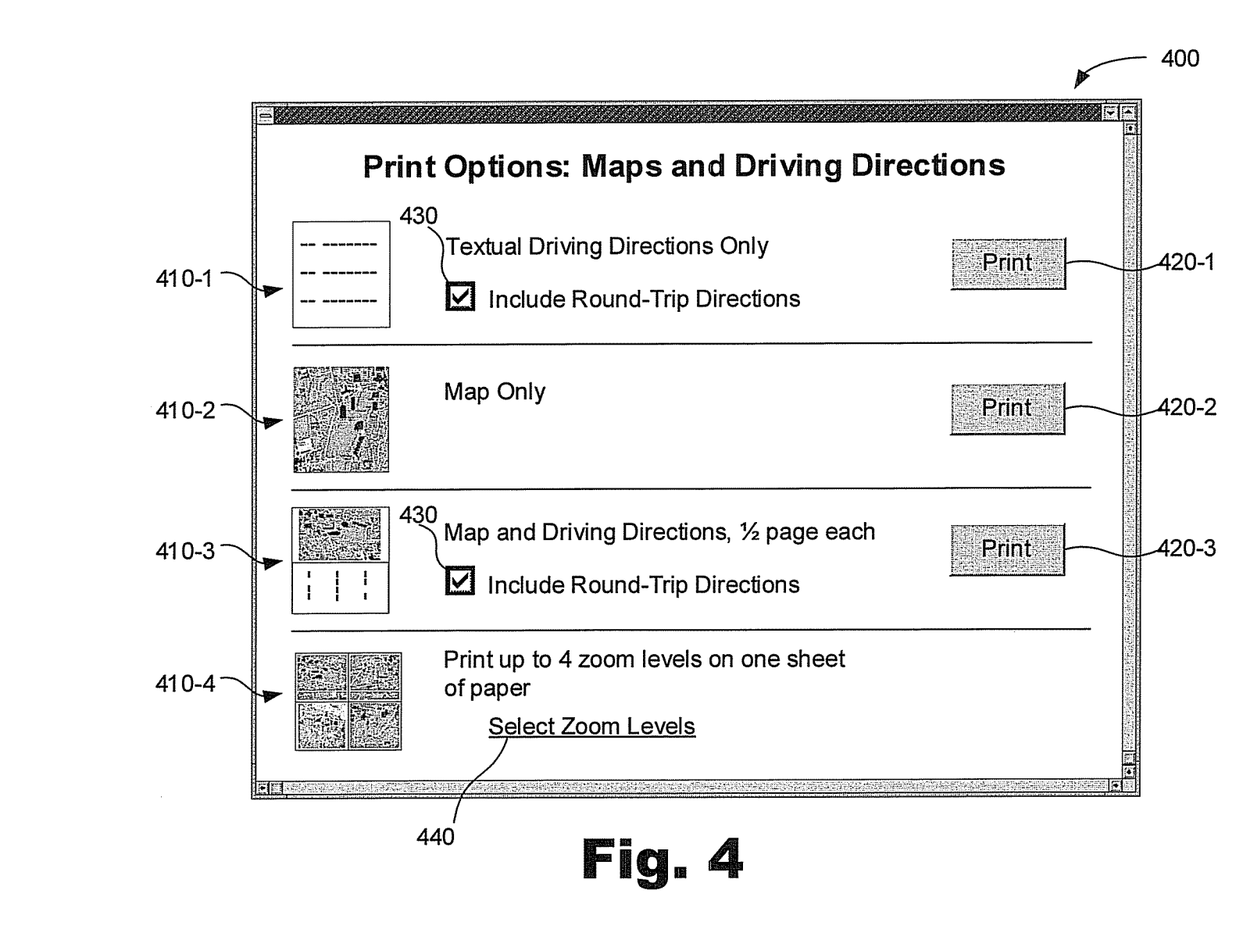
FIG. 4 illustrates another exemplary graphical user interface including exemplary selectable driving direction print options.

The print tool 240 shown in FIGS. 2 and 3 may be configured to function as a hyperlink to selectable print options and/or other print tools that may be utilized by the user to control printing of driving directions. When a user selects the print options tool 240, another graphical user interface having additional print options and/or tools may be presented to the user. For example, FIG. 4 illustrates an exemplary graphical user interface ("GUI") 400 including a plurality of selectable print options 410-1 through 410-4 (collectively "print options 410"). In certain embodiments, GUI 400 may be presented in response to a selection of the print options tool 240 or in response to an occurrence of another predefined event.

Each of the print options 410 shown in FIG. 4 may be associated with a predefined print format for driving directions. In certain embodiments, each of the print options 410 is associated with a different print format.

In the example shown in FIG. 4, print option 410-1 is associated with a print format for including only textual driving directions in a printing. When a user selects print tool 420-1, which has been predefined to correspond with print option 410-1, the access device 130 may prepare and send print instructions to the print device 138, the print instructions including data for printing only textual driving direction steps such as those shown in FIG. 2.

Print option 410-1 may also include selectable option 430 for including roundtrip driving directions (e.g., directions for traveling from Location A to Location B and back) in a printout of textual driving directions. With the selectable option 430 selected as shown in FIG. 4, when a user selects print tool 420-1, the access device 130 may generate and send print instructions to the print device 138, the print instructions including data for printing textual driving direction steps for both traveling from a starting location to a destination location and for returning from the destination location to the starting location. Accordingly, the user can obtain a printout of driving direction steps for both directions of travel without having to first load both sets of driving directions in a web page for display. In this manner, print option 410-1 can save time as well as processing resources by reducing the number of steps to be executed for printing roundtrip driving directions.

In FIG. 4, print option 410-2 is associated with a print format for printing only a map. When a user selects print tool 420-2, which has been predefined to correspond with print option 410-2, the access device 130 may prepare and send print instructions to the print device 138, the print instructions including data for printing only a map such as the map 320 shown in FIG. 3.

Although not shown in FIG. 4, print option 410-2 may include a selectable option (similar to selectable option 430) for printing maps representative of roundtrip travel. Roundtrip maps may be especially helpful for cases in which different routes are used for different directions of travel between two locations, which situation is not uncommon. Accordingly, a map printout generated in response to a selection of print option 420-2 may include one map corresponding with outgoing driving directions steps or two maps corresponding to driving direction steps for both outgoing and return trip (i.e., roundtrip) directions.

In the example shown in FIG. 4, print option 410-3 is associated with a print format for printing a combination of textual driving directions and a map. For example, driving direction steps 220 of FIG. 2 and map 320 of FIG. 3 may be combined in a single printout. The combination may be configured to be printed in any suitable print area. When a user selects print tool 420-3, which has been predefined to correspond with print option 410-3, the access device 130 may prepare and send print instructions to the print device 138, the print instructions including data for printing a combination of textual driving directions and a map.

In FIG. 4, the combination is configured for printing on a single page (e.g., a single sheet of paper or a single display screen) with the textual driving directions occupying approximately half the page, and the map may occupy approximately the other half of the page. Of course, other print area ratios and/or sizes may be used. For example, the textual driving directions and the map may each be printed on a separate page.

In some examples, print option 410-3 may enable the user to select the print area size and/or ratio to be used for printing a combination of textual and map driving directions. For example, the user may select the number of pages to be used for a printout and/or the ratio of a print area to be occupied by each component of the printout. For instance, the user may select to have the textual driving directions occupy approximate one quarter of the print area and the map to occupy approximately three quarters of the print area.

Print option 410-3 may also include selectable option 430 for including roundtrip driving directions in a printout of a combination of textual driving directions and a map. With the selectable option 430 selected as shown in FIG. 4, when a user selects print tool 420-3, the access device 130 may generate and send print instructions to the print device 138, the print instructions including data for printing textual driving direction steps for traveling from a starting location to a destination location and for returning from the destination location to the starting location. The print instructions may also include data for printing maps corresponding to both the outgoing and return trip directions of travel.

In FIG. 4, print option 410-4 is configured to enable a user to select, from a plurality of map views, one or more map views for inclusion in a printing In certain embodiments, one or more different map views up to a predefined maximum (e.g., four different map views) may be selected for printing on a single page. The map views may include different zoom levels such that a user can print different levels of detail on one print page.

Figure 5:
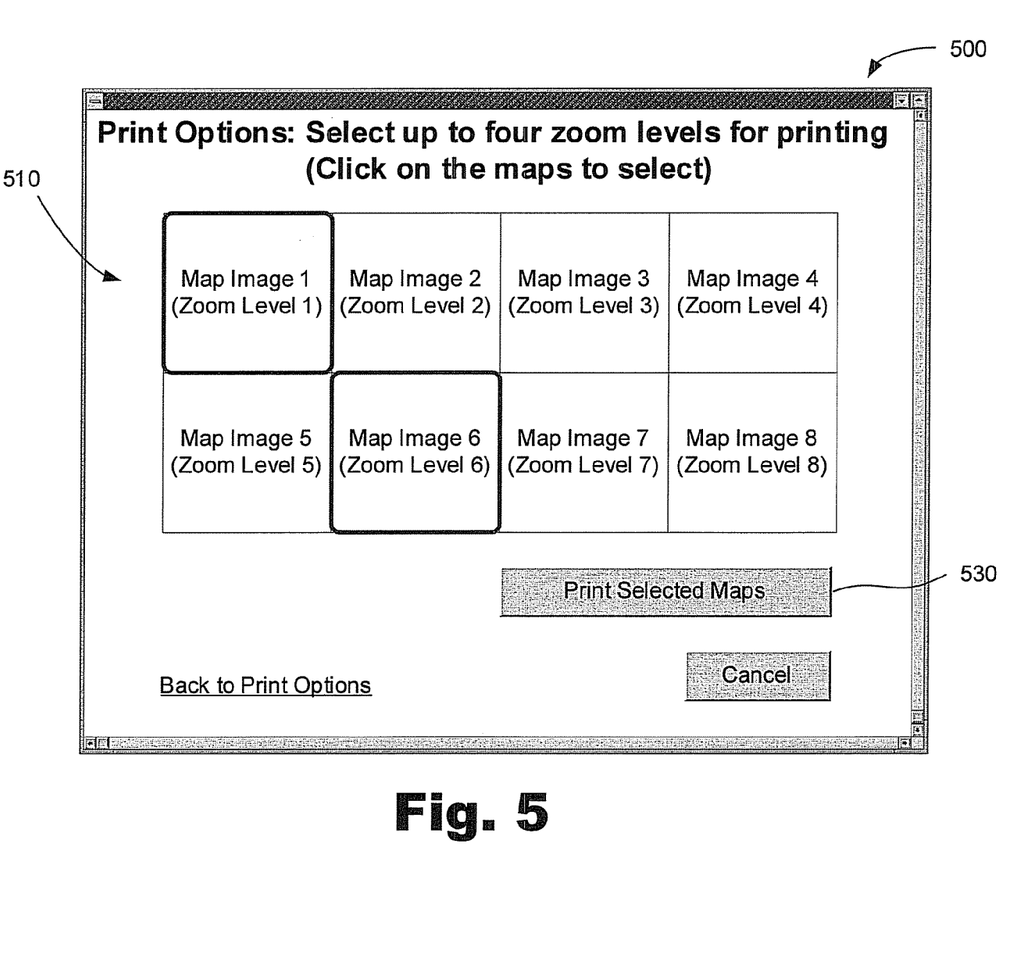
FIG. 5 illustrates another exemplary graphical user interface including exemplary selectable map views having different zoom levels.

In certain embodiments, the user may select hyperlink 440 to launch another graphical user interface including tools for selecting map views to be included in a printout. When hyperlink 440 is selected, for example, the driving directions subsystem 110 may provide graphical user interface ("GUI") 500 to the access device 130 for presentation to the user, as shown in FIG. 5. As shown, GUI 500 may provide a plurality of selectable map views 510, which may be concurrently displayed in the GUI 500.

One or more of the selectable map views 510 up to a predefined maximum may be selected for inclusion in a printing. In the example shown in FIG. 5, eight (8) different selectable map views 510 are displayed, and the user is able to select up to four (4) of the eight (8) selectable map views 510 for inclusion in a printout. Significantly, a user can select multiple different map views for inclusion in a printout, including map views having different zoom level views of a geographic area.

GUI 500 may be configured to visually indicate the selectable map views 510 that are currently selected. Any suitable indicator may be used. In FIG. 5, the first and sixth map images are selected and highlighted.

Once one or more of the selectable map views 510 have been selected, the user may select a "Print Selected Maps" tool 530. The access device 130 may generated and send print instructions to the print device 138, the instructions including data for printing the selected map views. In this manner, a user is able to selectively print multiple map views in a single printout (e.g., on a single page), including map views having different zoom levels. Combining different map views having different zoom levels in a printout can be especially helpful to a user navigating the geographic areas shown in the map views. During certain segments of travel (e.g., covering long distances quickly by driving on a highway), a high-level map view may be most useful, but a detailed zoom level map view may be most helpful during other segments of travel (e.g., when navigating side streets to find a destination location). With different zoom level map views printed on a single page, a user does not have to fumble through multiple pages (e.g., multiple sheets of paper or graphical user interfaces) to refer to different map views. This can reduce driver distractions and thereby improve safety for navigating unfamiliar areas.

The driving directions subsystem 110 may be configured to scale the size of at least a subset of driving directions based on the number of steps included in the driving directions. For example, textual driving direction steps such as the driving steps 210 of FIG. 2 may be scaled in size based on the number of steps included in the driving directions. The scaling may be performed independently of or in conjunction with any of the print tools or options described above, including scaling the size of driving directions for hardcopy and/or electronic display printings.

In certain examples, scaling of driving directions may be performed automatically in accordance with predefined heuristics and thresholds. For example, font size for textual driving direction steps may be set based on the number of steps in the driving directions. In general, the font size may be set larger for fewer numbers of steps and smaller for an increased number of steps. Accordingly, driving direction steps can be scaled in size to substantially fill a predefined print area regardless of the number of steps included in the driving directions.

In certain examples, predefined thresholds are associated with font sizes. The predefined thresholds may define numbers or number ranges of driving directions steps. In certain embodiments, for example, when the number of driving directions steps is less than or equal to twenty (20), the font size may be set to a fourteen point (14 pt) font size. When the number of driving directions steps is greater than twenty-one (21), the font size may be set to a twelve point (12 pt) font size.

The thresholds and corresponding font sizes may be defined as may best serve a particular application, print option, and/or print area. For example, the thresholds and font sizes may be adjusted for different print options and/or different size print areas (e.g., a full-page versus a half-page area).

Figure 6:
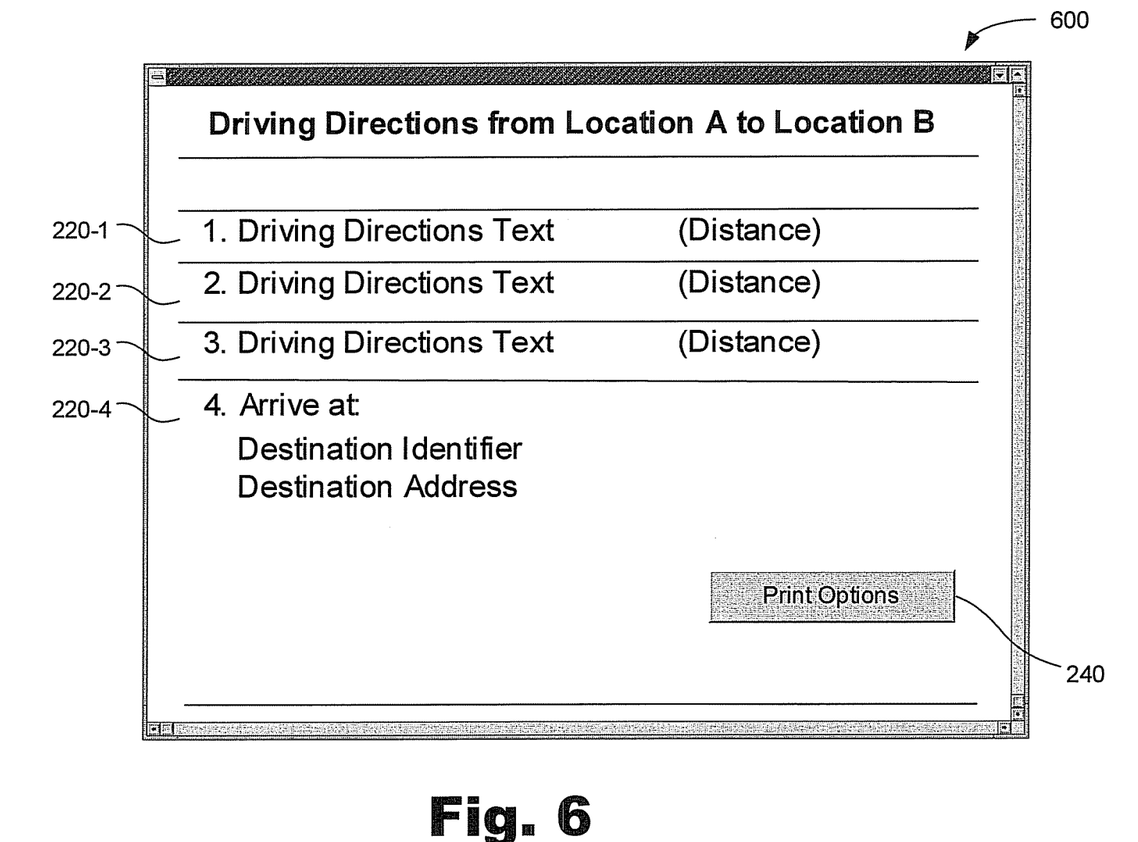
FIG. 6 illustrates the graphical user interface of FIG. 2 including exemplary scaled driving directions.

FIG. 6 illustrates a graphical user interface ("GUI") 600 depicting an example of font size scaling of driving directions. GUI 600 includes four driving direction steps 220-1 through 220-4 having a sixteen point (16 pt) font size, which may be applied in accordance with a predefined heuristic. For example, the predefined heuristic may specify a sixteen point (16 pt) font size for five (5) or fewer driving steps 220, and a twelve point (12 pt) font size for more than five (5) driving steps 220. GUI 200 of FIG. 2 includes six driving steps 220-1 through 220-6 having a twelve point (12 pt) font size in accordance with the predefined heuristic described in this example.

In this or similar manner, font size can be automatically scaled based on the number of steps included in driving directions. Alternatively or additionally, spaces between driving direction text (e.g., spaces above and/or below driving direction steps) may be scaled based on the number of driving direction steps. In general, the space may be made smaller for larger numbers of steps and larger for fewer numbers of steps. In this manner, spaces between driving direction text may be compressed or expanded based on the number of driving direction steps.

The scaling of driving directions (e.g., textual driving steps and/or spaces between the steps) may be performed dynamically when driving direction steps are generated and provided. For example, the driving directions engine 170 and/or the access module 160 of the driving directions subsystem 110 may be configured to scale the size of driving directions to be provided to the access device 130.

Similarly, sizes of map images may also be dynamically scaled to fit within predefined print areas. For example, the size of map images may be scaled based on the number of map images and/or the number of driving direction steps to be included in a print area.

The scaling of the size of driving directions enables the driving direction subsystem 110 to dynamically maximize the usage of available print areas based on at least one measurable characteristic of the driving directions. For example, scaling heuristics may be designed to maximize the size of driving directions that can fit within a print area, thereby making the driving directions as large and readable as can be supported by the print area and the number of steps included in the driving directions.

III. Exemplary Process View

Figure 7:
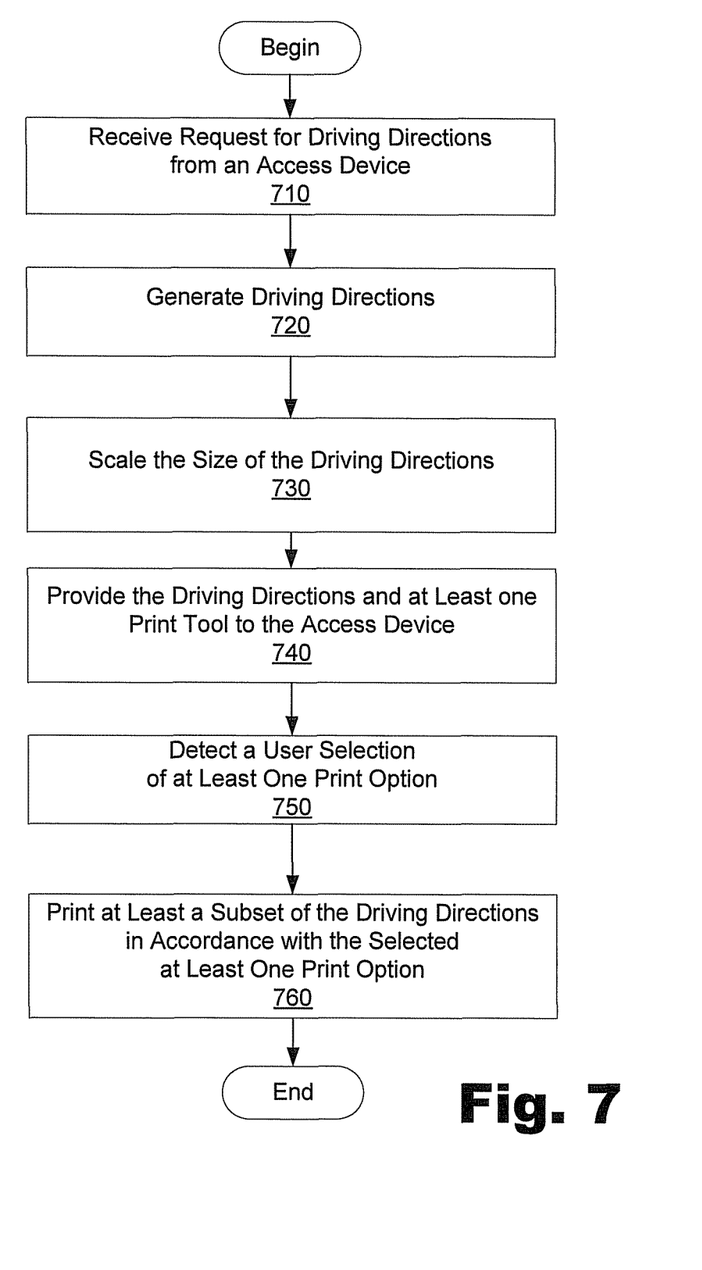
FIG. 7 is a flowchart illustrating an exemplary process for printing driving directions.

FIG. 7 is a flowchart illustrating an exemplary process for printing driving directions, according to an embodiment. While FIG. 7 illustrates exemplary steps according to one embodiment, other embodiments may omit, add to, reorder, and/or modify any of the steps shown in FIG. 7.

In step 710, a request for driving directions is received from an access device. Step 710 may be performed in any of the ways described above, including the driving directions subsystem 110 receiving the request from the access device 130.

In step 720, driving directions are generated. The driving directions are generated based on and in response to the request. Step 720 may be performed in any of the ways described above. For example, the driving directions engine 170 may use data in the data store 180 to generate driving directions, as described above.

In step 730, the size of the driving directions is scaled. Step 730 may be performed in any of the ways described above, including the access module 160 or the driving directions engine 170 applying a predefined heuristic to the generated driving directions to scale the size of at least a subset of the driving directions (e.g., a font size of textual driving steps) based on the number of steps included in the driving directions. Step 730 may be performed at various points in the process shown in FIG. 7. For example, step 730 may be performed in conjunction with a printing of driving directions such as the printing of step 760 described below.

In step 740, the driving directions and at least one print tool are provided to the access device. Step 740 may be performed in any of the ways described above. For example, data representative of the driving directions and the at least one print tool may be inserted into one or more messages (e.g., HTML messages) that are then transmitted to the access device 130. The access device 130 can present the driving directions and the at least one print tool in a user interface (e.g., the user interface 135) for consideration by the user of the access device 130. As described above, the at least one print tool may include at least one print option that can be selected by the user. The at least one print option may include any of the print options described above. In certain embodiments, the at least one print option includes a plurality of selectable map views from which the user can select at least one map view for inclusion in a printing or at least a subset of the driving directions.

In step 750, a user selection of at least one print option is detected. Step 750 may be performed in any of the ways described above. For example, the user of the access device 130 can utilize any of the tools described above to select one or more of the print options described above. Data representative of the selection can be transmitted from the access device 130 to the driving directions subsystem 110, which can detect the selection.

In step 760, at least a subset of the driving directions is printed in accordance with the selected at least one print option. Step 760 may be performed in any of the ways described above, including the access device 130 transmitting a print request and data representative of driving direction information and print settings to the printing device 138. The printing device 138 then prints the driving direction information in accordance with the print settings.

The above-described systems and methods provide tools for printing driving directions. The tools provide users with significant control over the information included in and the layout of printed driving directions. Accordingly, a user can select from different print options to define a printout of at least a subset of driving directions as may fit specific user preferences and situations. These and other features of the present systems and methods enable users to produce printed driving directions in forms that can help reduce the distractions and stresses associated with using printed driving directions when navigating unfamiliar driving routes.

In another embodiment, the systems and methods described above may be applied to deal with the constraints of mobile devices that provide limited viewing areas. For example, access devices such as mobile phones, personal digital assistants (PDAs) and other mobile video-enabled devices are known which may be connected to, for example, wireless data networks which provide connectivity to a driving directions subsystem (such as driving directions subsystem 110). These devices typically include displays that are reduced in size for various reasons (e.g., size, power, and/or cost constraints). However, due to their mobile nature, these devices may be useful to provide driving directions which can be carried with the user, and may be more convenient than hardcopy printed directions (which require access to a hardcopy printing device).

Applying the descriptions provided above, the GUIs illustrated in FIGS. 2-6 (or modified versions of the GUIs) may be displayed on a mobile access device. In such implementations, any of the print tools described above may be configured to apply to the display of driving direction information on a display screen of a mobile access device. In this manner, the print tools may be used for efficient utilization of the limited space of mobile device displays.

IV. Alternative Embodiments

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The above description and accompanying drawings are accordingly to be regarded in an illustrative rather than a restrictive sense.

What is claimed is:

1. A system comprising:
a driving directions subsystem configured to
   provide data representative of driving directions to an access device communicatively coupled to said driving directions subsystem, and
   provide at least one print tool including a plurality of selectable map views to the access device, said at least one print tool enabling a user of the access device to select, from the selectable map views, at least one map view-for inclusion in a printing of at least a subset of the driving directions, wherein the at least one print tool includes a plurality of selectable print options corresponding to different formats for printing at least a subset of the driving directions for the selected map view.

2. The system of claim 1, wherein the selectable map views are configured for concurrent display in a graphical user interface presented by the access device.

3. The system of claim 1, wherein the selectable map views include different zoom level views of a geographic area.

4. The system of claim 1, wherein the at least one print tool is configured to visually indicate the selection of the at least one map view for inclusion in the printing.

5. The system of claim 1, wherein said driving directions subsystem is further configured to provide a print selected map tool to the access device, said print selected map tool enabling the user of the access device to initiate the printing of the selected at least one map view.

6. The system of claim 1, wherein the at least one selected map view includes multiple ones of the selectable map views.

7. The system of claim 1, wherein the driving directions include textual driving direction steps, said driving direction subsystem being configured to scale a font size of at least a subset of the textual driving direction steps based on a number of the textual driving direction steps included in the driving directions.

8. The system of claim 7, wherein said driving direction subsystem is configured to apply a first font size when the number of textual driving direction steps is less than or equal to a predefined threshold and to apply a second font size when the number of textual driving direction steps is greater than the predefined threshold.

9. The system of claim 7, wherein the driving directions include spaces between the textual driving direction steps, said driving direction subsystem being configured to scale a size of at least a subset of the spaces based on the number of the textual driving direction steps included in the driving directions.

10. The system of claim 1, wherein the printing includes at least one of a hardcopy printing and an electronic displaying of the at least a subset of the driving directions.

11. A system comprising:
a driving directions subsystem configured to provide data representative of driving directions to an access device communicatively coupled to said driving directions subsystem, the driving directions including textual driving direction steps, wherein a font size of at least a subset of the textual driving directions steps is scaled based on a number of the textual driving directions steps included in the driving directions; and
wherein said driving directions subsystem is configured to provide to the access device at least one print tool including a plurality of selectable print options corresponding to different formats for printing at least a subset of the driving directions.

12. The system of claim 11, wherein a first font size is applied to the at least a subset of the textual driving directions when the number of the textual driving direction steps is less than or equal to a predefined threshold and a second font size is applied to the at least a subset of the textual driving directions when the number of the textual driving direction steps is greater than the predefined threshold.

13. The system of claim 11, wherein the driving directions include spaces between the textual driving direction steps, a size of at least a subset of the spaces being scaled based on the number of the textual driving direction steps included in the driving directions.

14. The system of claim 11, wherein the at least one print tool includes a plurality of selectable map views for concurrent display in a graphical user interface, said at least one print tool enabling a user of the access device to select, from the selectable map views, multiple ones of the selectable map views for inclusion in a printing of at least a subset of the driving directions.

15. The system of claim 11, wherein the print tool is configured to enable a user of the access device to select a ratio of a print area to be occupied by different components of the driving directions.

16. A method comprising:
providing data representative of driving directions to an access device communicatively coupled to said driving directions subsystem; and
providing at least one print tool including a plurality of selectable map views to the access device, said at least one print enabling a user of the access device to select, from the selectable map views, at least one map view for inclusion in a printing of at least a subset of the driving directions, wherein said at least one print tool includes a plurality of selectable print options corresponding to different formats for printing at least a subset of the driving directions for the selected map view.

17. The method of claim 16, further comprising the access device concurrently displaying the selectable map views in a graphical user interface, the selectable map views including different zoom level views of a geographic area.

18. The method of claim 16, the at least one selected map view including multiple ones of the selectable map views.

19. The method of claim 16, the driving directions including textual driving direction steps, and further comprising scaling a font size of at least a subset of the textual driving direction steps based on a number of the textual driving direction steps included in the driving directions.

20. The method of claim 19, said scaling including:
applying a first font size when the number of the textual driving direction steps is less than or equal to a predefined threshold; and
applying a second font size when the number of the textual driving direction steps is greater than the predefined threshold.

21. The method of claim 19, the driving directions including spaces between the textual driving direction steps, and further comprising scaling a size of at least a subset of the spaces based on the number of the textual driving direction steps included in the driving directions.

22. The system of claim 1, wherein the print tool is configured to enable a user of the access device to select a ratio of a print area to be occupied by different components of the driving directions.

23. The system of claim 16, wherein the print tool is configured to enable a user of the access device to select a ratio of a print area to be occupied by different components of the driving directions.

* * * * *